May 17, 1927.

H. E. BRICE

COUPLING

Filed Jan. 8, 1926

Henry E. Brice
INVENTOR

BY Victor J. Evans
ATTORNEY

WITNESS:

May 17, 1927.

H. E. BRICE

COUPLING

Filed Jan. 8, 1926

Henry E. Brice
INVENTOR

BY Victor J. Evans
ATTORNEY

May 17, 1927.

H. E. BRICE

COUPLING

Filed Jan. 8, 1926

Henry E. Brice
INVENTOR

BY Victor J. Evans
ATTORNEY

Patented May 17, 1927.

1,629,375

UNITED STATES PATENT OFFICE.

HENRY E. BRICE, OF NEW YORK, N. Y.

COUPLING.

Application filed January 8, 1926. Serial No. 80,057.

This invention relates to improvements in couplings, and has particular reference to a transmission coupling.

The primary object of the invention is to provide a means for locking two rotative bodies, such as two shafts, or a shaft and sleeve, so that they rotate as a single unit, the locking being as thorough and positive as if they were provided with interlocking teeth, and yet having no clashing parts during the locking operation.

To more clearly understand the above object, it might be well to mention that heretofore two rotative bodies have been locked or coupled together by one or two ways, namely by friction means, such as a friction clutch, and interlocking means, that is means wherein mutual interlocking parts are brought into co-acting relation. The friction means have two features which in some respects are serious defects, one is a gradual, slipping hold and the other is the necessity for great pressure by the use of springs. The interlocking means have neither of these defects, but have another defect of their own, which is the clash of the whirling, interlocking parts at the time of interlocking. My object is to combine the advantages of the interlocking means, a thorough positive hold, and freedom from springs with the advantage of the frictional means, that is, the freedom from the clashing parts.

It will be appreciated, that if two shafts or sleeves can be coupled at will without clashing, these parts may operate gears which are always in mesh, and the operation of coupling such parts will be easier than the sliding of gears. This is the principal use to which my invention is adapted and is especially designed for connecting the driving shaft and the driven shafts of the transmission of a motor propelled vehicle.

With these and other objects in view, the invention resides in certain novel construction and combination and arrangement of parts, the essential features of which are hereinafter fully described, are particularly pointed out in the appended claims, and are illustrated in the accompanying drawing, in which:—

Like characters of reference refer to like parts throughout the several different forms of my invention.

Figure 1:
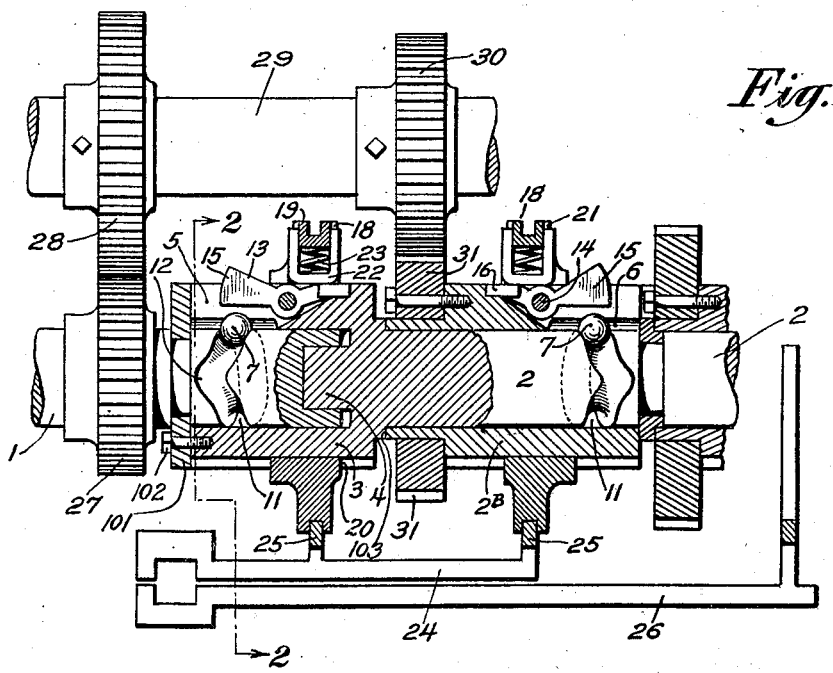
Figure 1 is a vertical longitudinal sectional view showing my invention as applied to the transmission of a motor vehicle.
Figure 2:
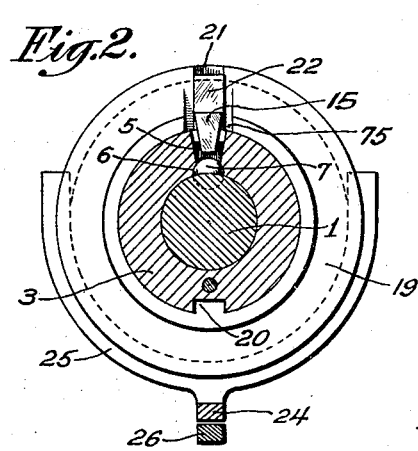
Figure 2 is a vertical transverse sectional view on the line 2—2 of Figure 1.

Referring more particularly to the drawing, the reference numeral 1 designates a driving shaft, and 2 the shaft to be driven or the driven shaft. These shafts or parts are correspondingly numbered through the several modified forms but in the preferred form, these shafts are shown as a part of the transmission of a motor propelled vehicle, or other motor driven machine wherein transmission mechanism is employed. The shafts are disposed in axial alignment and normally rotate independently of each other. The shaft 2 has one of its ends enlarged to provide a sleeve 3 within which one end of the shaft 1 extends and is supported by a bearing 4 carried at the end of the shaft 2 and which is received in a recess provided in the end of the shaft 1. I have also shown a sleeve $2^B$ mounted on the shaft 2, but instead of being integral therewith, the sleeve is normally rotated with respect thereto, but may be caused to rotate with the shaft 2 in a manner similar to that which couples the shafts 1 and 2. A description of one will suffice for the other as the parts and operation are identical.

The wall of the sleeve 3 is provided with a longitudinal slot 5, the walls of which are inclined in opposite directions and are provided with grooves 6 for the reception of a slidable member 7. The member 7 is in the shape of a ball and is so seated in the grooves as to permit a portion of the periphery to extend into said slot. The coupling end of the shaft 1 is formed with a groove 11, and the same type of groove is provided in the shaft 2 for co-action with the respective parts which couple the shaft 2 with the sleeve 2ᴮ. The groove 11 extends about the periphery of the shaft 1 in such manner that its own center is not entirely in a perpendicular plane of the shaft. In other words, the groove is cam shaped as shown in Figure 1 of the drawings and it will be noted that one side of the groove is shown in full lines but the opposite side is illustrated in dotted lines and may be of any shape, providing a part of the groove is out of a perpendicular plane, and which part is shown at 12 in the drawings. The ball 7 extends into the groove 11, and it will be evident that with such groove the ball cannot travel through it without imparting reciprocation of the same along its track 6.

Figure 3:
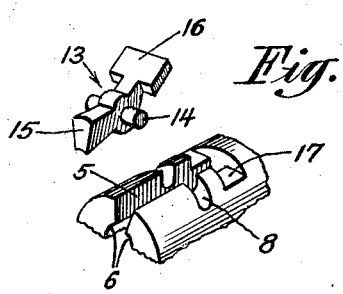
Figure 3 is a detail perspective view of the locking pawl separated from its supporting structure.
Figure 4:
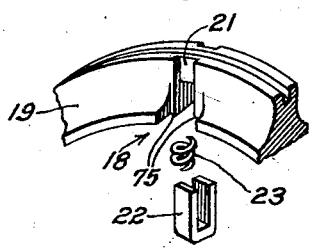
Figure 4 is a fragmentary perspective view of the shifting collar with its correlated part in separated condition.

From the description thus far, it will be seen that if the shaft 2 is held stationary while the shaft 1 is rotated the ball 7 is forced to slide to the right and left by reason of the same travelling in the cam shaped groove 11. It is my intention to provide means for locking and unlocking this ball by permitting or impeding this right and left motion. If when the ball 7 is at the limit of its left movement, something is placed in its path to prevent its returning to the right again, both shafts will be locked together for simultaneous rotation. For controlling the operation of the ball 7, I provide a pawl 13 having trunnions 14 which seat in recesses 8 communicating with the slot 5, so as to pivotally support the pawl within the slot and above the ball 7. The pawl 13 has a bill 15 at its forward end, the sides of which are inclined to conform to the shape of the walls of the slot 5 while the tail 16 extends at an angle with respect to the major portion of its length and is widened for reception in an enlarged portion 17 of the slot 5 as clearly shown in Figure 3 of the drawings.

For controlling the operation of the pawl 13, I employ manually operable control means 18 which includes a shifting collar 19 which is keyed to the exterior of the sleeve 3 as at 20 for sliding movement with respect thereto. The shifting collar is cut-away as at 21 to slidably receive a yieldable U-shaped part 22 which is held under tension by an expansible spring 23 interposed between the collar and said part. The spring constantly holds the part 22 in engagement with the pawl 13.

For manually sliding the collar 19 with respect to the pawl, I provide a shifting rod 24 such as are used for shifting gears on the sliding gear system of transmission. The shifting rod carries forks 25 for co-action with the shifting collars of the respective coupling means, and it will be readily understood that an operating lever is employed for imparting the necessary sliding movement to the rod 24. I have deemed it necessary to show mechanism operable by only two of these collars but if desired, any number may be provided, and a second shifting rod 26 may be disposed adjacent the rod 24 for controlling other shifting collars, and which rod may also be controlled by a suitable lever.

A collar 101 which could be made in halves, is provided for the purpose of anchoring the sleeve 3 against longitudinal movement away from the shaft 1, the said collar being bolted to the sleeve as at 102. The shoulder 103 on the shaft 2 prevents similar movement of the sleeve 2ᴮ.

As hereinbefore mentioned, shaft 1 represents the driving shaft and in the preferred form, the same may be termed the shaft which leads from the clutch to the transmission and which imparts rotation to a gear 27 fixed thereto, and which meshes with a gear 28 fixed to a counter-shaft 29. A gear 30 is also fixed to the counter shaft and meshes with a gear 31 carried by the sleeve 2ᴮ. All of these parts are revolved simultaneously with the shaft 1, but they have no effect on the shaft 2 unless the sleeve 2ᴮ or 3 is locked. This locking can be accomplished by pushing the rod 24 either to the right or left, and pushing the same to the left will lock the shaft 2 by its sleeve 3 with the shaft 1 while movement of the same to the right will cause locking of the sleeve 2ᴮ with the shaft 2. In Figure 1 of the drawings, the rod 24 is shown as in a neutral position and the only effect produced by turning the shaft, would be to reciprocate the sliding balls 7. It will be appreciated that it is perfectly feasible to have the shaft 1 lead to the universal instead of leading from the clutch and to have the shaft 2 lead from the clutch instead.

In operation, when the shifting collar 19 is moved toward the left in Figure 1, the part 22 pushes against the forward end of the pawl 13 and imparts a rocking movement thereto, causing the bill 15 to move downward toward shaft 1. It might be here mentioned that normally the part 22 engages the tail 16 of the pawl which holds the bill out of the path of movement of the ball 7. If, at the moment the shifting collar is thrown to the left, the sliding ball 7 is at the limit of its left movement, the bill 15 of the pawl will drop behind the ball, thus blocking the return of the same to the right, causing the locking of the shafts 1 and 2. In the event that the ball 7 is in an intermediate position when the shifting collar is moved to the left, said collar will cause the spring 23 to be placed under compression at which time the end of the pawl will remain idle for a half-revolution or less of the shaft 1, until the ball 7 reaches its extreme left position, then the spring 23 will force the bill 15 of the pawl behind the ball.

From the foregoing, it will be understood that either shaft may be the driven shaft providing one of the shafts is normally motionless while the other is rotated. The rotation of either shaft will cause the reciprocation of the ball 7 for causing the same to co-act and lock with the walls of the cam portion 12 of the groove 11.

Figure 5:
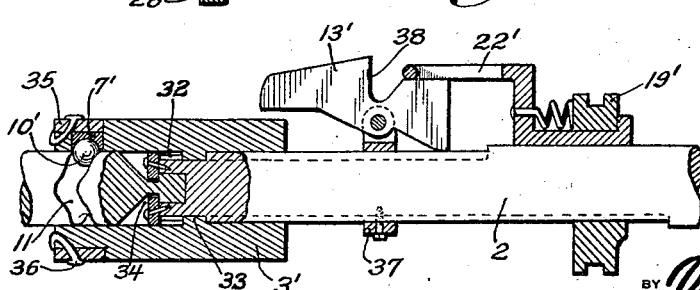
Figure 5 is a vertical sectional view showing a slightly modified form of my invention.
Figure 6:
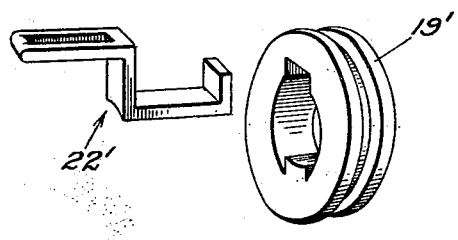
Figure 6 is a detail perspective view of the pawl actuating device shown in Figure 5.

In Figures 5 and 6 of the drawing, I have shown a slightly modified construction in which the sleeve 3' is separate from the shaft 2 but is slidable with respect thereto and rotatable therewith. The end of the shaft 2 is provided with key ways 32 for receiving the respective keys 33 provided on the sleeve 3'. The shafts 1 and 2 are swivelly connected together as at 34 so as to normally rotate independently of each other. The sleeve 3' is reduced and recessed to receive a member 7' having a seat for receiving a spherical member or ball 10' which extends into the cam groove 11. The member 7' is held within the sleeve by a ring 35 which encircles the reduced portion of the sleeve and is secured thereto by cotter pins 36.

In this form of the invention, the entire sleeve 3' is reciprocable and is held against movement by a pivoted pawl 13' mounted upon the shaft 2 by a collar 37. The shifting collar 19' is keyed to, and slidable over shaft 2 and operates a yieldable part 22' which engages the shoulder 38 on the pawl for tilting the same. In operation, the pawl 13' drops behind the end of the sleeve when the shifting collar has been moved and the sleeve is in its extreme left position.

Figure 7:
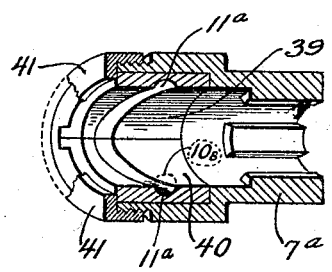
Figure 7 is a sectional perspective view of another modification.

In Figure 7 of the drawing, the construction is somewhat similar to that shown in the preferred form but in which the groove 11^A is formed in a pair of semi-cylindrical parts 39 and 40, which serves as a lining and is held within the sliding member 7^A by a ring or nut 41 threaded to said member. The ball 10^B is seated in a semi-circular depression in the shaft 1. A suitable means may be employed for locking the sleeve against reciprocation, which will cause the ball 10^B to co-act with the walls of the groove 11^A, to cause rotation of both shafts.

Figure 8:
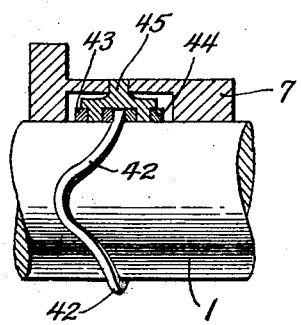
Figure 8 is a detail sectional view of another modified form.
Figure 9:
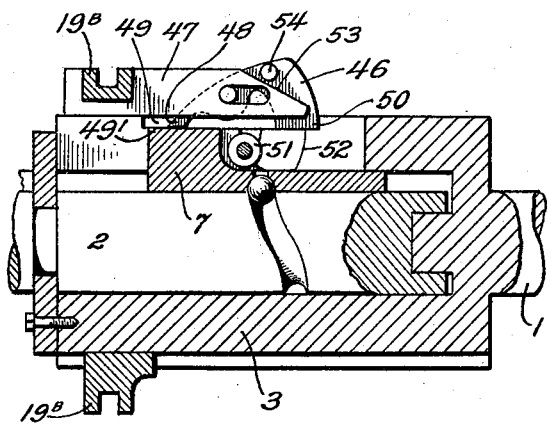
Figures 9, 10, 11 and 12 are detail views of a still further modification.

In Figure 8, I have shown that instead of having a cam shaped groove formed in the shaft 1, the same may be provided with a similar shaped rib 42 which passes between spaced rollers 43 and 44, carried by a part 45 which in turn is anchored to the sliding member 7.

Figure 10:
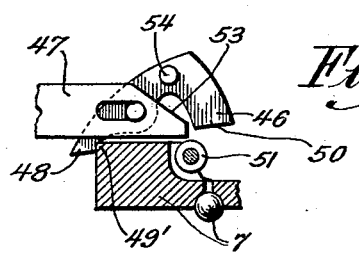
Figure 11:
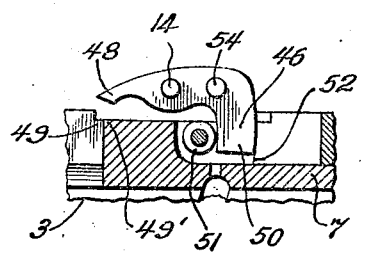
Figure 12:
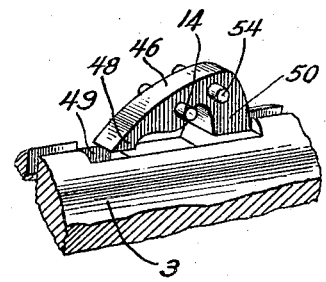

In the form of my invention shown in Figures 9 to 12 inclusive, I provide a means for locking the shafts which would be especially adapted to shafts revolving at a high rate of speed. In these figures, the shaft 1 is intended to do the driving and carries a pawl 46 pivotally mounted on the sleeve 3 as at 14 and which travels with the sleeve. This pawl is controlled by a sliding part 47 carried by the shifting collar 19^B. When the part 47 is at the extreme left as shown in Figure 10, the nose 48 of the pawl extends down within a recess 49 which is clearly shown in Figure 12, providing the sliding member 7 is not at that moment obstructing its movement. If the sliding member 7 happens to be in the way the pawl remains stationary until the member moves a sufficient distance to permit the nose to be dropped down. Centrifugal force acting on the other end of the pawl, tends to cause the nose to drop to an engagement position. As soon as the nose 48 is down, it is ready to be caught by the corner 49' of the part 7 as shown in Figure 10, and this corner, in sending the nose 48 out of its way, rocks the pawl and sends the end 50 behind the roller 51 carried by the member 7. As the part 7 endeavors to return, it finds its path blocked by the tail or end 50 which is now moved between the roller 51 and the ridge 52 as shown in Figure 11 of the drawing. The controlling part 47 is the only means which holds the pawl against the sleeve 7. The unlocking is accomplished by having the controlling part 47 moved toward the right, in which case the beveled face 53 on the member pushes against the stud 54 on the pawl and lifts the end 50 out of the recess.

Figure 13:
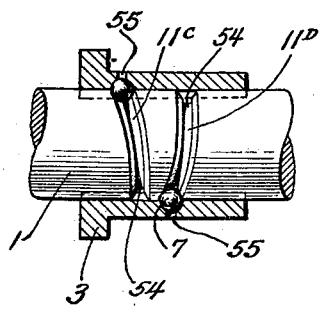
Figures 13 and 14 illustrate further embodiments of my invention.

In Figure 13, I have shown that the shaft 1 may have more than one groove and sliding member and in this figure, I have shown a pair of grooves 11^C and 11^D. The eccentric points in these grooves are approximately 180° apart, that is, the same are arranged at diametrically opposite points on the shaft. It will be appreciated that more than two grooves might be provided if desired and if four are employed, the grooves would be arranged at 90° apart, the idea being to have all the sliding members 7 at their far points at one time. The sliding members can be either detached as shown in Figure 13 or they can be parts of one integral piece.

In this form, I have also shown grooves as being provided with a channel 54 to facilitate the movement of a lubricant, while the sliding member 3 is provided with semi-circular recesses for the reception of the spherical members and which recesses communicate with the exterior of the sleeve through suitable openings 55.

Figure 14:
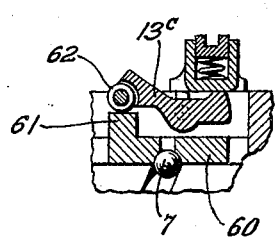

In Figure 14, I have shown a modified form similar to that shown in the preferred form but in which the ball 7 is seated against a sliding member 60 provided with an upstanding lug 61 to be engaged by a pawl 13^C which carries a roller 62 on its bill. The action of the pawl is the same as the preferred forms with the exception that the same co-acts with the member 60 instead of directly with the ball.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a coupling for driving in either direction, the combination of a driving rotatable part, a driven rotatable part, a reciprocable member, movable in a plane parallel to the axis of said shafts, means on one of said parts for imparting reciprocation to said member upon rotation of said part, a swingingly mounted locking member, and means for holding said locking member out of the path of movement of said reciprocating member, to allow said parts to rotate independently of each other.

2. In a coupling, the combination of a driving rotatable part, a driven rotatable part, a reciprocable member movable in a plane parallel to the axis of said shafts, means on one of said parts for imparting reciprocation to said member upon rotation of said part, a locking member, and means for holding said locking member out of the path of movement of said reciprocating member, to allow said parts to rotate independently of each other, and control means for actuating said last means for moving the same into the path of movement of said reciprocable member to cause the same to co-act with the first mentioned means to impart rotation from said driving part to said driven part.

3. In a coupling, the combination of a driving part, a driven part, a reciprocable member movable in a plane parallel to the axis of said shafts, means on one of said parts for imparting reciprocating motion to said member upon rotation of said part, a locking member, means for normally holding said locking member out of the path of movement of said reciprocating member, and manual control means for actuating said last mentioned means for causing the same to engage said first means for causing simultaneous rotation of both said parts.

4. In a coupling, the combination of a driving part, a driven part, a reciprocable member movable in a plane parallel to the axis of said shafts, means on one of said parts for imparting reciprocating motion to said member upon rotation of said part, a locking member, slidable means for normally holding said locking member out of the path of movement of said reciprocating member, and manual control means for sliding said last mentioned means for causing the same to engage said first means for causing simultaneous rotation of both said parts.

5. In a coupling for driving in either direction, a pair of revoluble shafts disposed in axial alignment and normally revoluble independently of each other, a body keyed to one of said shafts, co-acting means between said body and the other of said shafts for causing said body to slide longitudinally on the said shaft to which it is keyed upon the rotation of one shaft and the non-rotation of the other shaft, and control means for placing a solid obstruction in the path of sliding movement of said body to cause said shafts to rotate simultaneously.

6. In a coupling, the combination of a pair of shafts disposed in axial alignment and normally rotatable with respect to each other, a body slidably and non-rotatively connected to one of said shafts, means on the other of said shafts for coaction with said body for causing the same to move longitudinally to-and-fro upon the rotation of either shaft with respect to the other of said shafts, and an anchored member normally disposed out of the path of said body and capable of movement into the path of the same for causing the said shafts to revolve together.

7. In a coupling, a driving revoluble member, a driven revoluble member, a body both slidably and non-rotatatively connected to said driven member, means on said driving member for co-action with said body for moving said body longitudinally to-and-fro along said driven member when either of said members is revolved out of unison with the other, an obstructing member anchored to said driven member against longitudinal movement and normally held out of the path of sliding movement of said body, and means for actuating said obstructing member to move the same into the path of sliding movement of said body for causing said members to revolve simultaneously in the same direction.

8. In a coupling for driving in either direction, a driving revoluble member, a driven revoluble member, a body slidably and non-rotatively connected to one of the members, means co-acting with said body and the other of the members to cause said body to move longitudinally to-and-fro along the member to which it is slidably connected, means for anchoring said driving and driven members against longitudinal axial movement, and a solid obstruction movable into the path of movement of said body for causing said members to rotate simultaneously.

In testimony whereof I have affixed my signature.

HENRY E. BRICE.